Patented Nov. 11, 1952

2,617,825

UNITED STATES PATENT OFFICE 2,617,825

PROCESS FOR PREPARATION OF SALTS OF 1-AMINO-2-HALOETHANES

Thomas F. Wood, Clifton, N. J., assignor to The Givaudan Corporation, a corporation of New Jersey No Drawing. Application June 4, 1948, Serial No. 31,203

6 Claims. (Cl. 260—563)

This invention relates to a novel process for preparing salts of 1-amino-2-haloethanes, and more especially my process involves the preparation of these salts from 2-oxazolidones.

The products made in accordance with my process can be used as intermediates for the preparation of substances recently found to be of significant medical importance. In my co-pending application, Serial Number 31,407, filed June 5, 1948, and matured into Patent Number 2,540,155, I disclose and claim a novel process for preparing these medically-significant substances which are shown to possess unique sympatholytic and adrenolytic characteristics by recent and current medical literature. Unfortunately, as pointed out in my aforementioned co-pending application, the cost of these sympatholytic and adrenolytic agents is high and it is desirable to reduce the cost of their preparation.

By my present invention I have succeeded in preparing the aforesaid intermediates for the aforesaid sympatholytic and adrenolytic medicinal agents in a technically-feasible manner. By simplifying the process of preparing the aforesaid intermediates it follows that a desirable advance has been made with regard to the medicinal agents themselves.

In general, my novel process embraced by the present invention involves the treating of 2-oxazolidones with a halogen acid, preferably in a suitable solvent, to form a hydrohalide salt of 1-amino-2-haloethane, in accordance with the following equation:

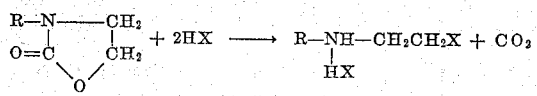

wherein R is H or an organic radical, and X is a halogen. R may be, for example, benzyl, 1-naphthylmethyl, phenoxyethyl, cyclohexyl and ring-substituted phenoxyethyl radicals.

In addition to providing a technically-feasible process for preparing salts of 1-amino-2-haloethanes in good yields my present invention is also characterized by the fact that these products are obtained from the 2-oxazolidones in one chemical step.

In conducting my novel process I employ 2-oxazolidones, such as 2-oxazolidone, N-benzyl-2-oxazolidone or N-cyclohexyl-2-oxazolidone. These materials may be prepared in accordance with the method of R. Adams and J. B. Segur, J. A. C. S., 45, 785 (1923) or according to the method disclosed in U. S. Patent 2,399,118.

Hydrogen halides useful in my present process include hydrogen chloride and hydrogen bromide.

While my process may be conducted in the absence of solvents I have found it desirable to employ suitable solvents such as ethanol and butanol. Any solvent which is chemically inert under the reaction conditions may be used, provided it is a solvent for the hydrogen halide employed.

It is more convenient to use a solvent in carrying out the reaction since the resulting products, the salts of 1-amino-2-haloethanes, are usually high melting solids melting considerably higher than the temperature required for the cleavage. Furthermore, it is advantageous to use a solvent from which the products will crystallize on cooling.

The amounts of reactants to employ can be determined from the above chemical equation. I have found it desirable to use an excess (about 10%) of hydrogen halide. It is desirable to bubble in the latter over a period of time and while the contents of the reaction chamber are at elevated temperatures. Thus, for example, the halide may be added over a period of 3 to 4 hours at temperatures of about 80° C. to about 120° C. If desired, lower temperatures may be employed but the reaction will take longer to complete. Higher temperatures can also be employed, provided the temperature is below the decomposition temperature of the resulting hydrohalide. Anhydrous conditions while not necessary are nevertheless desirable. Isolation of the resulting product is facilitated by such conditions. In any case the amount of water present should be limited for best results. Atmospheric or superatmospheric pressure may be employed herein.

It may be noted here that the ease of reaction of the 2-oxazolidones with hydrogen halides under the comparatively mild conditions of this process without a catalyst was rather surprising since the conversion of the corresponding 1-amino-2-hydroxyethanes to the same products requires somewhat more drastic conditions. For example, in order to convert 1-benzylamino-2-hydroxyethane to 1-benzylamino-2-chloroethane hydrochloride, using hydrogen chloride, a temperature in the vicinity of 165°–170° C. is required.

In order more fully to describe my invention the following examples are given. It is understood that they are for purposes of illustration and not limitation.

EXAMPLE 1

PREPARATION OF 1 - BENZYLAMINO - 2 - CHLOROETHANE

Hydrochloride by the Cleavage of N-Benzyl-2-oxazolidone in the Presence of Butanol (a) *Preparation of N-benzyl-2-oxazolidone*

Into a 1 liter distilling flask was placed: 152 grams (1 mole) of 1-benzylamino-ethanol-2-, 354 grams (3 moles) of diethyl carbonate, and 300 grams of benzol.

The benzol was distilled off along with a small amount of diethyl carbonate (B. P. 85°–100° C.) at atmospheric pressure in order to render the residual solution anhydrous. To the residual liquid, after cooling, was added 1 gram of metallic sodium. The resulting solution was heated slowly up to 130° C. over a 4 hour period during which time there was distilled off through a 30 cm. packed column 92 grams of ethanol, B. P. 78°–80° C. The excess diethyl carbonate was then distilled off under reduced pressure. The liquid residue amounting to 176 grams was dissolved in 176 grams of benzol and the solution filtered. To the warm benzol solution was added textile spirits (light petroleum naphtha) until a very slight turbidity resulted. On cooling and stirring, there crystallized out N-benzyl-2-oxazolidone. The yield was 161 grams of product, M. P. 77°–78° C. or 91 percent of theory. After recrystallization from a mixture of textile spirits and benzol, the melting point was 78°–80° C.

(b) *Preparation of 1-benzylamino-2-chloroethane hydrochloride*

Into a 500 ml. flask provided with stirrer, gas inlet tube and reflux condenser was charged: 26 grams of benzyl-2-oxazolidone, M. P. 78°–80° C. (0.147 mole) and 79 grams of n-butanol.

The solution was heated to reflux temperature with stirring and there was slowly bubbled in anhydrous HCl gas over a 4 hour period while refluxing. During this time, some crystals separated on the walls of the flask. The solution was then cooled in ice-water with stirring and the crystals which separated out were filtered off, washed with a little cold butanol and air-dried. The yield was 24 grams of white crystalline material, M. P. 196°–197° C. When mixed with a sample of authentic 1-benzylamino-2-chloroethane hydrochloride, there was observed no depression in melting point. The yield was 80 per cent of theory without further recovery of product from the mother liquor.

EXAMPLE 2

Preparation of 1-benzylamino-2-chloroethane Hydrochloride by the Cleavage of N-Benzyl-2-oxazolidone in the Presence of Ethanol Into a suspension of 35.4 grams (0.2 mole) of benzyl-2-oxazolidone in 100 grams of ethanol at room temperature was run 20 grams of HCl gas.

The solution was heated to reflux with stirring and held at this temperature while there was bubbled in a further 15 grams of HCl gas over a 1½ hour period. The refluxing was then continued for 5 hours longer. The solution on cooling in ice-water deposited white crystals which were filtered off, washed with a little cold alcohol and dried. Yield equaled 22 grams, M. P. 195°–196° C. The filtrate was evaporated leaving a crystalline residue. This residue was pulverized and warmed with three times its weight of acetone. The acetone suspension was cooled and the crystals filtered off and dried—weight 10 grams. Recrystallization from alcohol gave 6 grams of snow-white plates, M. P. 195°–197° C. The acetone wash solution was evaporated leaving a crystalline deposit of unconverted N-benzyl-2-oxazolidone amounting to 6.5 grams. The total yield of 1-benzylamino-2-chloroethane hydrochloride was 28 grams or 85 percent of theory based on the converted benzyl-2-oxazolidone.

EXAMPLE 3

Preparation of 1-benzylamino-2-chloroethane Hydrochloride by the Cleavage of N-Benzyl-2-oxazolidone in the Presence of 1-benzylamino-2-hydroxyethane Into a solution of 35.4 grams (0.2 mole) benzyl-2-oxazolidone in 76.0 grams of 1-benzylamino-2-hydroxyethane (0.5 mole) there was passed with stirring anhydrous HCl gas. During the formation of the hydrochloride of 1-benzylamino-2-hydroxyethane there was heat evolved and the temperature was allowed to spontaneously rise to 120° C. Then the solution was maintained at this temperature and there was passed in 40–50 grams more of HCl gas over a period of 3½ hours. Then when the mixture had cooled, there was added 200 grams of ethanol and the mixture boiled to dissolve all crystalline material. On cooling and crystallizing, there was obtained 41 grams of white crystalline material, M. P. 162°–172° C. This material was crystallized from 80 grams of ethanol to yield 27 grams of product, M. P. 188°–190° C. There was no depression in melting point when some pure 1-benzylamino-2-chloroethane hydrochloride was mixed in, showing that the material is mainly the same compound.

EXAMPLE 4

Preparation of 1-amino-2-chloroethane Hydrochloride

Into a 500 ml. flask with a gas inlet tube, agitator and reflux condenser was placed: 43.5 grams of 2-oxazolidone (0.5 mole) and 130.5 grams of n-butanol.

The mixture was heated to reflux and there was passed in with stirring over a 4 hour period: 50 grams of anhydrous HCl.

The solution was cooled with stirring and a white crystalline material separated. This was filtered off, washed with a little cold butanol and then thoroughly washed with isopropyl ether. This material was hygroscopic and could not be air-dried. It was vacuum-dried and obtained as a white crystalline compound, M. P. 146°–148° C. A mixed melting point determination with authentic 1-amino-2-chloroethane hydrochloride gave no depression. The yield was 45 grams which was 76.3 percent of theory without further recovery from the mother liquors.

EXAMPLE 5

Preparation of 1-cyclohexylamino-2-chloroethane Hydrochloride (a) *Preparation of N-cyclohexyl-2-oxazolidone*

There was reacted: 71.5 grams of 1-cyclohexylamino-ethanol-2- (0.5 mole), 236.0 grams of diethyl carbonate, and 0.5 gram of metallic sodium, in exactly the same manner as was described for the preparation of N-benzyl-2-oxazolidone except that it was necessary to vacuum-distill the crude N-cyclohexyl-2-oxazolidone. It was difficult to purify by crystallization because of its low melting point and high solubility in solvents. The yield of the compound was 78 grams. It is a colorless crystalline compound having the following properties:

Melting point=33°–34° C.
Boiling point=128°–131° C. at 0.5 to 1.0 mm.

(b) *Preparation of 1-cyclohexylamino-2-chloroethane hydrochloride*

There was dissolved: 52 grams of cyclohexyl-2-oxazolidone (0.308 mole) in 104 grams of n-butanol.

The solution was heated to reflux and there was bubbled in anhydrous HCl gas over a 4 hour period at such a rate that there was added altogether about 30 grams. The solution was cooled with stirring and there crystallized out a snow-white flocculent solid material which was filtered off and washed with isopropyl ether. The material was vacuum-dried and amounted to 28 grams, M. P. 217°–219° C., sintering at 210° C. Concentration of the mother liquors yielded a further 5 grams of the compound. The product is 1-cyclohexylamino-2-chloroethane hydrochloride. From the mother liquor was recovered 20 grams of unconverted cyclohexyl-2-oxazolidone.

Analysis of 1-cyclohexylamino-2-chloroethane hydrochloride:

|  | Found | Calculated |
|---|---|---|
| Percent Cl | 35.76 | 35.85 |

The foregoing illustrates my invention, which however is not to be limited thereby but is to be construed as broadly as permissible in view of the prior art and limited solely by the appended claims.

I claim:

1. The process for preparing substances having the following structural formula:

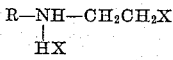

wherein R is a member selected from H, aryl, 1-naphthylmethyl, phenoxyethyl, cycloalkyl and ring-substituted phenoxyethyl radicals, and X is chlorine and bromine, which comprises reacting a compound having the structural formula:

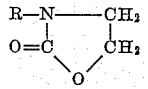

with a hydrogen halide under substantially anhydrous conditions at an elevated temperature.

2. The process for preparing 1-benzylamino-2-chloroethane hydrochloride, which comprises reacting N-benzyl-2-oxazolidone with hydrogen chloride under substantially anhydrous conditions at an elevated temperature.

3. The process for preparing 1-benzylamino-2-chloroethane hydrochloride, which comprises reacting N-benzyl-2-oxazolidone with hydrogen chloride in the presence of n-butanol under substantially anhydrous atmospheric reflux conditions.

4. The process for preparing 1-amino-2-chloroethane hydrochloride, which comprises reacting 2-oxazolidone with hydrogen chloride under substantially anhydrous conditions at an elevated temperature.

5. The process for preparing 1-amino-2-chloroethane hydrochloride, which comprises reacting 2-oxazolidone with hydrogen chloride in the presence of n-butanol under substantially anhydrous atmospheric reflux conditions.

6. The process for preparing 1-cyclohexylamino-2-chloroethane hydrochloride, which comprises reacting N-cyclohexyl-2-oxazolidone with hydrogen chloride in the presence of n-butanol under substantially anhydrous atmospheric reflux conditions.

THOMAS F. WOOD.

REFERENCES CITED

The following references are of record in the file of this patent:

UNITED STATES PATENTS

| Number | Name | Date |
|---|---|---|
| 2,446,192 | Pfister et al. | Aug. 3, 1948 |

FOREIGN PATENTS

| Number | Country | Date |
|---|---|---|
| 220,852 | Germany | Apr. 8, 1910 |
| 442,413 | Germany | Mar. 25, 1925 |

OTHER REFERENCES

Gabriel et al., "Ber. deut. Chem.," vol. 29, pp. 2381–2391 (1896).

Stratton et al., "J. Roy Tech. Coll." (Glasgow), vol. 3, pp. 21–23 (1933).

Desseigne, "Bull. Soc. Chim.," vol. 9, pp. 786–787 (1942).

Spielman, "J. Am. Chem. Soc.," vol. 66, pp. 1244–1245 (1944).

Simons, Ind. and Eng. Chem., vol. 39, p. 238 (1947).